(12) United States Patent
Koide et al.

(10) Patent No.: US 12,081,568 B2
(45) Date of Patent: Sep. 3, 2024

(54) EXTRACTION DEVICE, EXTRACTION METHOD, AND EXTRACTION PROGRAM

(71) Applicant: NIPPON TELEGRAPH AND TELEPHONE CORPORATION, Tokyo (JP)

(72) Inventors: Takashi Koide, Musashino (JP); Daiki Chiba, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 389 days.

(21) Appl. No.: 17/613,091

(22) PCT Filed: May 28, 2019

(86) PCT No.: PCT/JP2019/021166
§ 371 (c)(1),
(2) Date: Nov. 22, 2021

(87) PCT Pub. No.: WO2020/240718
PCT Pub. Date: Dec. 3, 2020

(65) Prior Publication Data
US 2022/0239684 A1 Jul. 28, 2022

(51) Int. Cl.
*H04L 9/40* (2022.01)
*G06F 16/906* (2019.01)
*G06F 21/56* (2013.01)

(52) U.S. Cl.
CPC ........ *H04L 63/1425* (2013.01); *G06F 16/906* (2019.01); *H04L 63/1416* (2013.01)

(58) Field of Classification Search
CPC ............. H04L 63/1425; H04L 63/1416; G06F 16/906; G06F 2221/2119; G06F 21/566; G06F 21/563
See application file for complete search history.

(56) References Cited

U.S. PATENT DOCUMENTS

| | | | |
|---|---|---|---|
| 2009/0089287 A1* | 4/2009 | Roberts | G06F 16/9535 |
| 2011/0321160 A1* | 12/2011 | Mohandas | H04L 63/1416 726/22 |

(Continued)

FOREIGN PATENT DOCUMENTS

CN 103678692 3/2014

OTHER PUBLICATIONS

Sakib Muhammad N et al: "Automated Collection and Analysis of Malware Disseminated via Online Advertising", 2015 IEEE Trustcom/Bigdatase/ISPA, IEEE, vol. 1, Aug. 20, 2015 (Aug. 20, 2015), pp. 1411-1416, XP032819811, DOI: 10.1109/TRUSTCOM.2015.539 [retrieved on Dec. 2, 2015], 6pp.

(Continued)

*Primary Examiner* — Darren B Schwartz
(74) *Attorney, Agent, or Firm* — XSENSUS LLP

(57) ABSTRACT

An extraction apparatus includes processing circuitry configured to receive an input of information about a plurality of web pages including a hypertext markup language (HTML) element that is known to reach a malicious web page through browser operation and an HTML element that is known to reach a benign web page through browser operation, classify the plurality of web pages whose input is received into clusters, extract an HTML element that reaches the malicious web page and an HTML element that reaches the benign web page from a web page of each cluster that is classified to extract a first character string included in HTML elements that are extracted, and extract, as a keyword, a second character string that characterizes the HTML element that reaches the malicious web page from the first character string.

6 Claims, 14 Drawing Sheets

(56) References Cited

U.S. PATENT DOCUMENTS

| | | | |
|---|---|---|---|
| 2012/0216280 A1* | 8/2012 | Zorn | G06N 7/01 |
| | | | 706/20 |
| 2014/0189864 A1 | 7/2014 | Wang et al. | |
| 2016/0088015 A1* | 3/2016 | Sivan | H04L 63/1416 |
| | | | 726/23 |
| 2016/0285894 A1* | 9/2016 | Nelms | H04L 63/145 |
| 2018/0041530 A1* | 2/2018 | Tang | H04L 63/1425 |
| 2018/0052992 A1* | 2/2018 | Palanichamy | G06F 21/53 |
| 2019/0155952 A1* | 5/2019 | Tang | G06F 16/24578 |
| 2020/0104488 A1* | 4/2020 | Li | G06F 40/221 |

OTHER PUBLICATIONS

Koide et al., "Automatically Collecting User-initiated Web-based Attacks", Technical Report of IEICE, ICSS2017-66, vol. 117, No. 481, Mar. 2018, pp. 91-96 (Including English Abstract).

* cited by examiner

| No. | ITEM |
|---|---|
| 1 | SCREEN SHOT IMAGE OF Web PAGE |
| 2 | HTML SOURCE CODE OF Web PAGE |
| 3 | HTML ELEMENT 1 THAT REACHES BENIGN Web PAGE |
| 4 | HTML ELEMENT 2 THAT REACHES BENIGN Web PAGE |
| 5 | ... |
| 6 | HTML ELEMENT 1 THAT REACHES MALICIOUS Web PAGE |
| 7 | HTML ELEMENT 2 THAT REACHES MALICIOUS Web PAGE |
| ... | ... |

Fig. 3

HTML    HTML ATTRIBUTE
ATTRIBUTE    VALUE

<a id=download-button>Download Now!</a>

HTML TEXT ELEMENT

Fig. 4

| No. | ITEM | NUMBER OF DIMENSIONS |
|---|---|---|
| 1 | IMAGE FEATURE (LOCAL FEATURE EXTRACTION) | GIVEN NUMBER |
| 2 | IMAGE FEATURE (COLOR HISTOGRAM) | 256X3 (NUMBER OF COLORS) |
| 3 | DOCUMENT FEATURE (TOPIC MODEL) | GIVEN NUMBER |
| 4 | DOCUMENT FEATURE (Bag-of-words) | GIVEN NUMBER OF WORDS |
| 5 | STRUCTURE FEATURE (HTML TAG HISTOGRAM) | GIVEN NUMBER OF TAGS |
| ... | ... | ... |

Fig. 6

| No. | Web PAGE | DETERMINATION RESULT |
|---|---|---|
| 1 | Web PAGE 1 | CLUSTER 1 |
| 2 | Web PAGE 2 | CLUSTER 2 |
| 3 | Web PAGE 3 | CLUSTER 3 |
| 4 | Web PAGE 4 | CLUSTER 1 |
| ... | ... | ... |

Fig. 7

| No. | HTML ELEMENT | CLUSTER | BENIGN/MALICIOUS |
|---|---|---|---|
| 1 | HTML ELEMENT 1 | CLUSTER 1 | MALICIOUS |
| 2 | HTML ELEMENT 2 | CLUSTER 2 | BENIGN |
| 3 | HTML ELEMENT 3 | CLUSTER 3 | MALICIOUS |
| 4 | HTML ELEMENT 4 | CLUSTER 1 | BENIGN |
| ... | ... | ... | ... |

Fig. 8

| No. | CHARACTER STRING | EXTRACTION OBJECT | HTML ELEMENT | CLUSTER | BENIGN/MALICIOUS |
|---|---|---|---|---|---|
| 1 | Download-button | HTML ATTRIBUTE 1 (id) | HTML ELEMENT 1 | CLUSTER 1 | MALICIOUS |
| 2 | News | HTML TEXT ELEMENT | HTML ELEMENT 2 | CLUSTER 2 | BENIGN |
| 3 | Download Now! | IMAGE REGION | HTML ELEMENT 3 | CLUSTER 3 | MALICIOUS |
| 4 | Click | HTML ATTRIBUTE 2 (class) | HTML ELEMENT 4 | CLUSTER 1 | BENIGN |
| ... | ... | ... | ... | ... | ... |

Fig. 9

| No. | CHARACTER STRING | IMPORTANCE | EXTRACTION OBJECT | CLUSTER |
|---|---|---|---|---|
| 1 | Download | 0.9 | HTML TEXT ELEMENT | CLUSTER 1 |
| 2 | Click | 0.8 | HTML TEXT ELEMENT | CLUSTER 1 |
| 3 | Now | 0.4 | HTML TEXT ELEMENT | CLUSTER 1 |
| 4 | Button | 0.2 | HTML TEXT ELEMENT | CLUSTER 1 |
| ... | ... | ... | ... | ... |

Fig. 10

| No | KEYWORD | EXTRACTION OBJECT | CLUSTER |
|---|---|---|---|
| 1 | Download | HTML TEXT ELEMENT | CLUSTER 1 |
| 2 | Click | HTML ATTRIBUTE 1 (id) | CLUSTER 2 |
| 3 | Play | HTML | CLUSTER 3 |
| 4 | Watch | HTML TEXT ELEMENT | CLUSTER 4 |
| ... | ... | ... | ... |

Fig. 11

EXTRACTION DEVICE, EXTRACTION METHOD, AND EXTRACTION PROGRAM

CROSS-REFERENCE TO RELATED APPLICATION

The present application is based on PCT filing PCT/JP2019/021166, filed May 28, 2019, the entire contents of which are incorporated herein by reference.

TECHNICAL FIELD

The present invention relates to an extraction apparatus, an extraction method and an extraction program.

BACKGROUND ART

To distribute malware, a generic term for malicious software, or to steal personal information, cyber attackers prepare web pages. The web pages are used to launch drive-by download (DBD) attacks, which target vulnerabilities in web browsers and plug-ins. Alternatively, the web pages may generate social engineering (SE) attacks, which psychologically induce users who have accessed to download malware and enter their personal information.

In order to analyze web pages that generate DBD attacks, there is a method of using a web-client honeypot, which is a decoy system that contains vulnerabilities. A web-client honeypot accesses a web page to determine the occurrence of a DBD attack, and sets destination information represented by the uniform resource locator (URL), domain name, and IP address of the web page, as a black list. Security apparatuses represented by firewalls and intrusion detection systems prevent users from being infected by malware by blocking web access to the blacklist.

An SE attack succeeds by psychologically inducing users to access a web page by giving them false information, such as fake malware infection or fake prize winning. One method of analyzing web pages that generate SE attacks is to actually access the web page with a web browser and perform browser operations to generate the SE attack (see, for example, NPL 1).

Here, in order to perform browser operations, it is necessary to identify the operation object on the web page. In general, when performing browser operations on a web page, the operation object is called a hypertext markup language (HTML) element. In the following description, an HTML element that induces SE attacks, i.e., an HTML element that reaches a malicious web page, is referred to as an inducing element.

The known method is an analysis method for survey attacks, which are a type of SE attack technique that tricks users into installing malware or entering their personal information in return for a survey. Since this method identifies only the inducing elements that lead to the survey attack, it has problems in terms of comprehensiveness in analysis of SE attacks.

The method disclosed in NPL 1 uses keywords set in advance for each type of web page to detect the inducing elements in order to identify the inducing elements comprehensively without being limited to the attack methods. The type of web page is a classification of web pages according to their roles and meanings. Examples of the type of web page include a web page that proposes to download a file and a web page that streams video.

For example, in a web page that proposes downloading a file to a user, a button to start downloading the file is often an inducing element. Examples of a button to start downloading a file include "Download" drawn in the area of the HTML element and "download-button" set in the HTML element id of the HTML element.

In a web page that streams video, a button to play the video is often an inducing element. Examples of a button to play a video include "Play" set in the HTML text element and "video-play" set in the HTML element class of the HTML element.

Thus, the character strings included in the inducing elements differ depending on the type of web page. Therefore, in order to correctly detect the inducing elements, it is necessary to determine the type of web page and identify the inducing elements through the use of a keyword set for each type of web page.

CITATION LIST

Non Patent Literature

NPL 1: Takashi Koide, Daiki Chiba, Yuta Takata, Mitsuaki Akiyama, Takeshi Yagi, Kunio Hato, "Automatically Collecting User-initiated Web-based Attacks", IEICE technical report, vol. 117, no. 481, ICSS2017-66, pp. 91-96, March, 2018.

SUMMARY OF THE INVENTION

Technical Problem

In the related art, keywords are empirically and manually set by the analyst. Also, the type of web page is determined based on rules empirically set in advance by the analyst.

The method disclosed in NPL 1 can identify the inducing element without being limited to the attack method. However, the method disclosed in NPL 1 relies on the experience of the analyst to determine the type of web page and to set the keywords, and consequently, the accuracy of the inducing element detection may be sacrificed in the case where the analyst is inexperienced.

For example, if the analyst is inexperienced and the keywords included in the inducing element are not comprehensively covered, the inducing elements may be missed. Also, if the analyst is inexperienced and keywords that are not included in the inducing elements are set, HTML elements that do not reach the SE attack may be falsely detected as inducing elements.

To begin with, there are a large number of web pages in the world, and the number of the character strings used in them are also large. For this reason, it is difficult for an analyst to identify the inducing elements and find keywords in the large amount of data, and even if it were possible, it would take a great deal of time. In the case where the analyst actually sets the keywords, the number of sample web pages is limited and the actual effectiveness of the keywords is unclear, and, the maintenance of the setting accuracy of the keywords is limited.

In view of the above, an object of the present invention is to provide an extraction apparatus, an extraction method and an extraction program that can automatically extract a keyword that characterizes an HTML element that reaches a malicious web page.

Means for Solving the Problem

To solve the above-described problems and to achieve an object, an extraction apparatus according to the present invention includes: processing circuitry configured to: receive an input of information about a plurality of web pages including a hypertext markup language (HTML) element that is known to reach a malicious web page through browser operation and an HTML element that is known to reach a benign web page through browser operation; classify the plurality of web pages whose input is received into clusters; extract an HTML element that reaches the malicious web page and an HTML element that reaches the benign web page from a web page of each cluster that is classified to extract a first character string included in HTML elements that are extracted; and extract, as a keyword, a second character string that characterizes the HTML element that reaches the malicious web page from the first character string.

An extraction method executed by extraction apparatus according to the present invention includes receiving an input of information about a plurality of web pages including a hypertext markup language (HTML) element that is known to reach a malicious web page through browser operation and an HTML element that is known to reach a benign web page through browser operation; classifying the plurality of web pages whose input is received into clusters; extracting an HTML element that reaches the malicious web page and an HTML element that reaches the benign web page from a web page of each cluster that is classified to extract a first character string included in HTML elements that are extracted; and extracting, as a keyword, a second character string that characterizes the HTML element that reaches the malicious web page from the first character string.

A non-transitory computer-readable recording medium storing therein an extraction program according to the present invention is configured to cause a computer to execute a process including: receiving an input of information about a plurality of web pages including a hypertext markup language (HTML) element that is known to reach a malicious web page through browser operation and an HTML element that is known to reach a benign web page through browser operation; classifying the plurality of web pages whose input is received into clusters; extracting an HTML element that reaches the malicious web page and an HTML element that reaches the benign web page from a web page of each cluster that is classified to extract a first character string included in HTML elements that are extracted; and extracting, as a keyword, a second character string that characterizes the HTML element that reaches the malicious web page from the first character string.

Effects of the Invention

According to the present invention, a keyword that characterizes an HTML element that reaches a malicious web page can be automatically extracted.

BRIEF DESCRIPTION OF DRAWINGS

FIG. 3 is a drawing illustrating an example of webpage information.

FIG. 4 is a drawing illustrating an example of an HTML source code part corresponding an HTML element.

FIG. 6 is a drawing illustrating an example of features extracted by a feature extraction unit illustrated in FIG. 2.

FIG. 7 is a drawing illustrating an example of web pages classified into clusters by a determination unit illustrated in FIG. 2.

FIG. 8 is a drawing illustrating an example of HTML elements extracted by an element extraction unit illustrated in FIG. 2.

FIG. 9 is a drawing illustrating an example of first character strings extracted by a character string extraction unit illustrated in FIG. 2.

FIG. 10 is a drawing illustrating an example of character strings whose importance is evaluated by an importance evaluation unit illustrated in FIG. 2.

FIG. 11 is a drawing illustrating an example of keywords extracted by the importance evaluation unit illustrated in FIG. 2.

DESCRIPTION OF EMBODIMENTS

Figure 1:
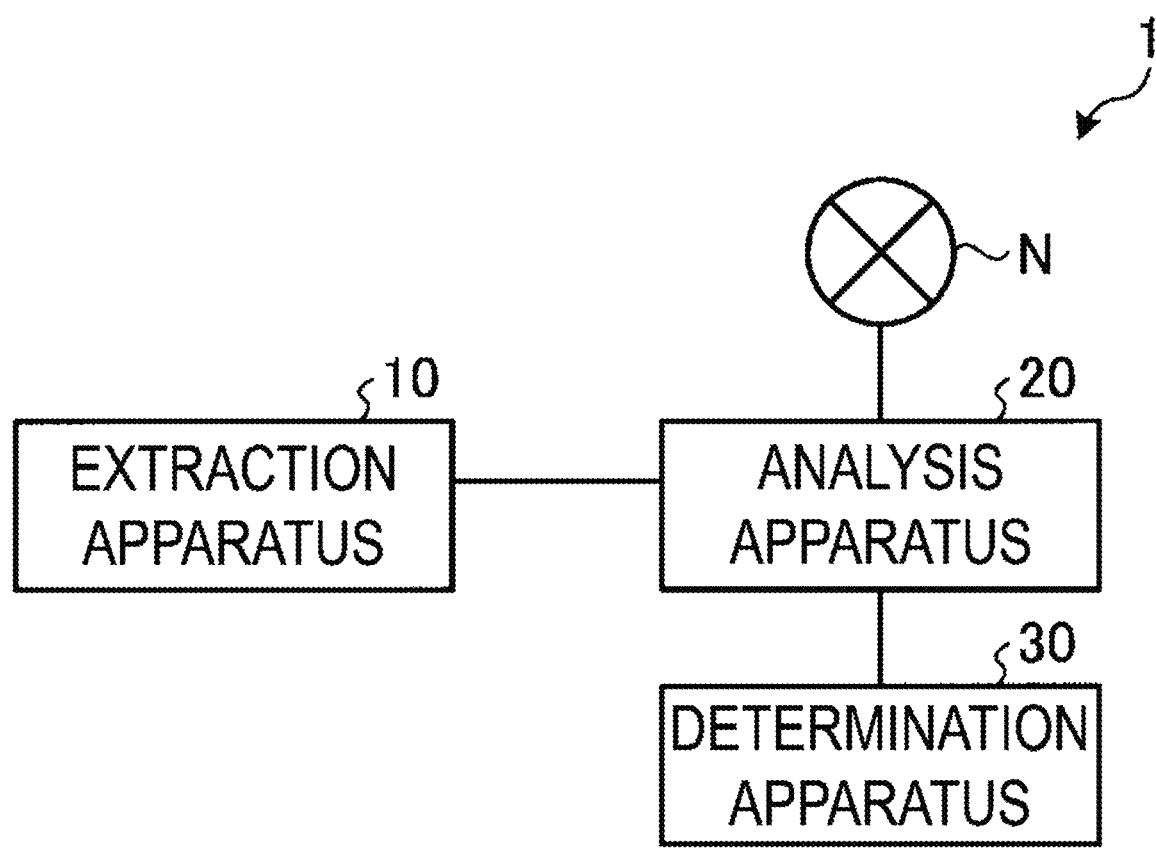
FIG. 1 is a drawing illustrating an example of a configuration of an analysis system of an embodiment.

An embodiment of the present invention is described in detail below with reference to the accompanying drawings. Note that the present invention is not limited to the embodiment. In addition, in the drawings, the same parts are denoted with the same reference numerals.

[Embodiment] An embodiment of the present invention is described below. FIG. 1 is a drawing illustrating an example of a configuration of an analysis system of the embodiment.

As illustrated in FIG. 1, an analysis system 1 according to the embodiment includes an extraction apparatus 10, an analysis apparatus 20, and a determination apparatus 30. The analysis apparatus 20 is connected to the extraction apparatus 10 and the determination apparatus 30. The analysis apparatus 20 is connected to an external apparatus (not illustrated in the drawing) through a network N. The extraction apparatus 10 may be connected to an external apparatus (not illustrated in the drawing) through the network N.

The extraction apparatus 10 extracts a keyword that characterizes an inducing element that is an element of HTML that reaches a malicious web page from information about a plurality of web pages including both an element of HTML that is known to reach a malicious web page and an element of HTML that is known to reach a benign web page. Note that in the following description, an element of HTML is referred to as an HTML element.

The analysis apparatus 20 analyzes an input web page to specify the URL of a web page that induces user operation. The analysis apparatus 20 observes an attack that induces user operation through a web page, by actively performing an operation on a web page collected through the network N. The analysis apparatus 20 detects a part that induces user operation on a web page as an operation object through the use of a keyword, output by the extraction apparatus 10, that characterizes an inducing element that is an HTML element that reaches a malicious web page. The analysis apparatus 20 outputs, to the determination apparatus 30, log data in which the operation object and an operation performed for the operation object are recorded.

Note that the attack that induces user operation is an attack that exploits psychological carelessness of the user by attracting the user's interest, warning the user, or deceiving the user to make the user install malware.

By referring to the log data output by the analysis apparatus 20, the determination apparatus 30 acquires malware and/or a malicious browser extension function, and specifies the operation and/or the operation object that leads to an attack. Then, the determination apparatus 30 determines the URL of a web page that generates an attack that induces user operation by referring to the log data output by the analysis apparatus 20. The determination apparatus 30 generates a black list based on the determination result. Each security apparatus (not illustrated in the drawing) prevents the user from being infected with the malware by blocking the web access to the black list.

Figure 2:
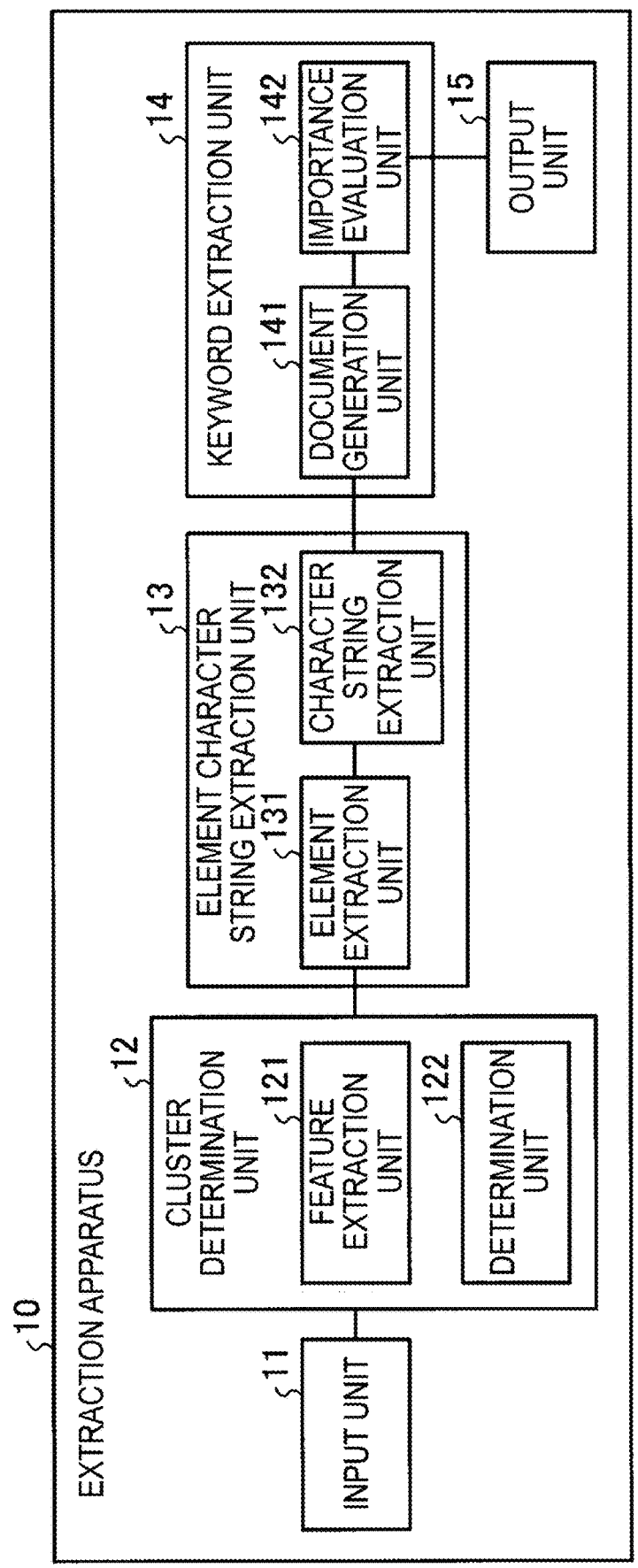
FIG. 2 is a drawing illustrating an example of a configuration of an extraction apparatus illustrated in FIG. 1.

[Extraction Apparatus] Next, a configuration of the extraction apparatus 10 is described. FIG. 2 is a drawing illustrating an example of a configuration of the extraction apparatus 10 illustrated in FIG. 1. The extraction apparatus 10 illustrated in FIG. 2 is implemented by reading a predetermined program into a computer or the like including a read only memory (ROM), a random access memory (RAM), a central processing unit (CPU) and the like, and executing the predetermined program at the CPU. In addition, the extraction apparatus 10 includes a network interface card (NIC) and the like, and can communicate with another apparatus through an electric communication line such as a local area network (LAN) and the Internet.

The extraction apparatus 10 includes an input unit 11, a cluster determination unit 12 (classification unit), an element character string extraction unit 13 (first extraction unit), a keyword extraction unit 14 (second extraction unit) and an output unit 15.

The input unit 11 receives an input of information about a plurality of web pages including an HTML element that is known to reach a malicious web page through browser operation and an HTML element that is known to reach a benign web page through browser operation. The browser operation includes, for example, moving the mouse pointer on a web page drawn in a web browser and clicking on it.

FIG. 3 is a drawing illustrating an example of webpage information. As illustrated in FIG. 3, conceivable items of webpage information are a screen shot image of the web page, an HTML source code of the web page, and an HTML element that reaches a benign web page or a malicious web page. Note that the items of webpage information are not limited to this.

Information held by the HTML elements is the corresponding HTML source code part and size (height and width) and coordinates (width and height) of the region. FIG. 4 is a drawing illustrating an example of an HTML source code part corresponding an HTML element. FIG. 4 is a drawing illustrating an example of a part of an HTML source code of a web page.

As illustrated in FIG. 4, a typical HTML element has a start tag (e.g., <a>) and an end tag (e.g., </a>), and may include an HTML text element between the tags. The HTML element may have an HTML attribute (such as "id" and "class") in the start tag, and a specific value (e.g., "download-button") set in each HTML attribute is called an HTML attribute value. In addition, an HTML element may include another HTML element in a nesting structure, in place of the HTML text element.

Figure 5:
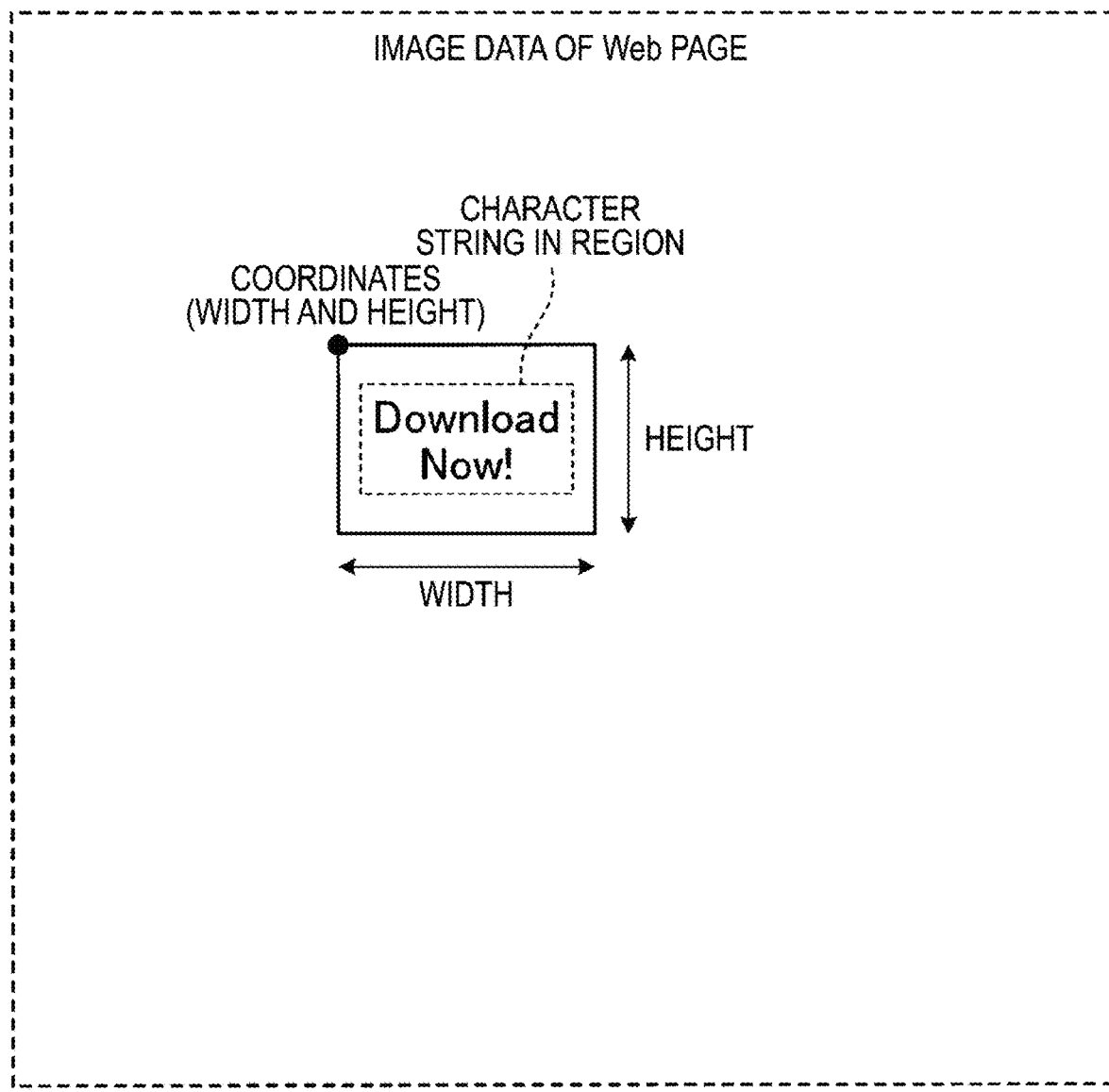
FIG. 5 is a drawing illustrating an example of an image region corresponding to an HTML element.

FIG. 5 is a drawing illustrating an example of an image region corresponding to an HTML element. As illustrated in FIG. 5, an image region corresponding to an HTML element is extracted by cutting out the image region from the screen shot image of the web page illustrated in FIG. 3 based on the size and coordinates of the region.

The webpage information described above is recorded through browser operation by an analyst by manually accessing a web page using a web browser. Alternatively, the webpage information is recorded through automatic browser operation by accessing a web page using software that automates the browser operation. As methods to confirm that a malicious web page has been reached, there are a method of crosschecking communication destination information such as the URL and/or domain name of the reached web page through the use of a black list of malicious communication destination information, and a method of extracting a feature from the reached web page to perform malicious determination using a machine learning technique.

The cluster determination unit 12 classifies, into clusters, a plurality of web pages received by the input unit 11 as an input. In other words, the cluster determination unit 12 determines the cluster of a web page with webpage information as an input. A keyword in an HTML element that characterizes an HTML element that reaches a malicious web page differs depending on the meaning and/or role of the web page. The cluster determination unit 12 automatically classifies web pages with similar meanings and/or roles to set keywords corresponding to the meanings and/or roles of the web pages. Each cluster is set to indicate the meaning and/or the role, for example. The cluster determination unit 12 includes a feature extraction unit 121 and a determination unit 122.

The feature extraction unit 121 extracts a feature based on each of a plurality of web pages received by the input unit 11 as an input. FIG. 6 is a drawing illustrating an example of features extracted by the feature extraction unit 121 illustrated in FIG. 2. The feature extraction unit 121 extracts an image feature, a document feature or a structure feature as features from webpage information.

The feature extraction unit 121 extracts image information representing visual information as an image information feature from image data of a screen of a web page drawn in a web browser. The feature extraction unit 121 extracts an image feature through the use of one or a plurality of image analysis techniques that can convert a screen shot image of a web page into vector information. The feature extraction unit 121 extracts an image feature to recognize a visual feature of the web page that have a psychological influence on the user.

Note that conceivable image analysis techniques are a local feature extraction technique and a color histogram analysis. The local feature extraction technique detects feature points in an image through the use of an image analysis technique represented by algorithms such as such as ORB, KAZE, and AKAZE, and converts the image data into vector information of a given dimension. Color histogram analysis measures a histogram of the frequencies of pixel values (e.g., 0-255) for each color such as red, green, and blue in image data, and converts the number of pixel values into vector information as the dimension.

The feature extraction unit 121 extracts, as a document feature, document information representing the meaning and/or topic of the document from text data in a web page. The feature extraction unit 121 extracts a document feature through the use of one or a plurality of natural language processing techniques that can convert, into vector information, document data that is a character string that is present in the HTML source code of the web page and is actually displayed on the web page. The feature extraction unit 121 extracts a document feature to recognize the feature of the web page that has a psychological influence on the user from the meaning and/or role of a passage.

Note that conceivable natural language processing techniques are a topic model method represented by a Doc2vec and latent Dirichlet allocation (LDA) and a Bag-of-words method of measuring the occurrence frequency of words. The topic model method is a method of estimating a potential meaning of document data to make a conversion to vector information of a given dimension. The Bag-of-words method is a method of measuring the occurrence frequency of words included in document data to make a conversion to vector information with the number of words used in the measurement as the number of dimensions.

The feature extraction unit 121 extracts, from a source code of a web page, HTML structure information representing the internal structure of the web page as a structure feature. The feature extraction unit 121 extracts the structure feature through the use of one or a plurality of statistical processing techniques that can convert an HTML source code of a web page into vector information. The feature extraction unit 121 extracts the structure feature to recognize the role of the web page. The feature extraction unit 121 measures the distribution of the occurrence frequency of HTML tags to extract the structure feature.

Note that the method of extracting the structure feature is not limited to this. For example, the feature extraction unit 121 may set the HTML tag of a measurement object in advance to make a conversion into vector information with the number of HTML tags as the dimension by counting the occurrence frequency in the HTML source code for each HTML tag.

The determination unit 122 integrates some or all of features extracted by the feature extraction unit 121. The determination unit 122 performs the integration of the features to perform clustering of some or all of the obtained features. Then, the determination unit 122 classifies the web pages into clusters by applying unsupervised learning with the integrated features as input data corresponding to the web pages.

In other words, the determination unit 122 classifies the web pages into clusters by integrating some or all of the features extracted by the feature extraction unit 121 as feature vectors of the web pages, and applying unsupervised machine learning technique to the feature vectors of the web pages. Through the integration of features, the determination unit 122 can generate feature vectors for recognizing the meaning and/or role of the web pages. In addition, through the application of unsupervised machine learning technique, the determination unit 122 can automatically classify web pages with similar meanings and/or roles.

The determination unit 122 uses an unsupervised machine learning technique that automatically sets the appropriate number of clusters, and sets the determined clusters as the clusters of the web pages. Conceivable examples of the unsupervised machine learning technique that automatically sets the number of clusters are DBSCAN, Mean-shift and X-means, but this is not limitative.

FIG. 7 is a drawing illustrating an example of web pages classified into clusters by the determination unit 122 illustrated in FIG. 2. For example, the determination unit 122 classifies "web page 1" and "web page 4" as "cluster 1", "web page 2" as "cluster 2", and "web page 3" as "cluster 3".

From the web pages of the clusters classified by the cluster determination unit 12, the element character string extraction unit 13 extracts an HTML element that reaches a malicious web page and an HTML element that reaches a benign web page. The element character string extraction unit 13 extracts a first character string included in the extracted HTML element. In other words, from the web pages of the clusters classified by the cluster determination unit 12, the element character string extraction unit 13 extracts an HTML element based on the webpage information. Then, the element character string extraction unit 13 extracts an HTML text element, an HTML attribute value or a character string in an image region as the first character string from each element, and classifies them for each cluster of the web page. The element character string extraction unit 13 includes an element extraction unit 131 and a character string extraction unit 132.

From the information about the web page of each cluster classified by the cluster determination unit 12, the element extraction unit 131 extracts, for each cluster, an HTML element that is known to reach a malicious web page and an HTML element that is known to reach a benign web page. That is, the element extraction unit 131 extracts an HTML element that reaches a benign web page and an HTML element that reaches a malicious web page based on the webpage information.

FIG. 8 is a drawing illustrating an example of HTML elements extracted by the element extraction unit 131 illustrated in FIG. 2. As illustrated in FIG. 8, each HTML element includes, as additional information, identification information of the cluster of the original web page, and information representing whether a malicious web page or a benign web page has reached as a result of browser operation performed on the HTML element. For example, it is indicated that regarding "HTML element 1", the original web page belongs to "cluster 1" and a malicious web page is reached when browser operation is performed.

The character string extraction unit 132 extracts the first character string from an HTML text element, an HTML attribute value or a character string in a region of the HTML element extracted by the element extraction unit 131. More specifically, the character string extraction unit 132 extracts the first character string from an HTML source code part and an image region of the HTML element extracted by the element extraction unit 131.

The character string extraction unit 132 extracts a text element and an HTML attribute value of an analysis object set in advance from the HTML source code part. From the image region, the character string extraction unit 132 extracts a character string drawn in the region as the first character string through the use of a known optical letter recognition technique. In the present embodiment, a keyword that characterizes an HTML element that reaches a malicious web page is set for each of the HTML text element, the HTML attribute value, and the character string drawn in the region for each type of web pages, and thus an HTML element including these keywords is specified as an HTML element that reaches a malicious web page. As such, the element character string extraction unit 13 extracts character strings from HTML elements in HTML element web pages with differentiation between benign or malicious.

FIG. 9 is a drawing illustrating an example of first character strings extracted by the character string extraction unit 132 illustrated in FIG. 2. As illustrated in FIG. 9, each character string includes additional information about the HTML text element, the HTML attribute or the character string in the region of the extraction source, in addition to the information about the HTML element of the extraction source. For example, it is indicated that regarding the character string "Download-button" as the first character string, the HTML element of the extraction source is "HTML element 1" that belongs to "cluster 1", the HTML attribute is "HTML attribute 1 (id)", and the HTML element of the extraction source reaches a malicious web page when browser operation is performed.

From the first character string extracted by the element character string extraction unit 13, the keyword extraction unit 14 extracts, as a keyword, a second character string that characterizes an HTML element that reaches a malicious web page. The keyword extraction unit 14 integrates the extracted first character string to the document data, and extracts, as a keyword, the second character string that characterizes an HTML element that reaches a malicious web page. The keyword extraction unit 14 includes a document generation unit 141 and an importance evaluation unit 142.

Based on the additional information of the first character string, the document generation unit 141 integrates a character string related to an HTML element that is known to reach a malicious web page in the first character string, and thus generates a first document corresponding to the HTML element that is known to reach a malicious web page. The document generation unit 141 generates the first document for each HTML text element or HTML attribute value of each cluster of the web page.

In addition, based on the additional information of the first character string, the document generation unit 141 integrates a character string related to an HTML element that is known to reach a benign web page in the first character string, and thus generates a second document corresponding to the HTML element that is known to reach a benign web page. The document generation unit 141 generates the second document for each HTML text element or HTML attribute value of each cluster of the web page.

The document generation unit 141 generates the first or second document by integrating the first character string into document data by arranging it in a unit of character strings that are identical in three factors, the extraction object (the HTML text element, the HTML attribute, and the character string in the region), the cluster, and whether the reaching web page is benign or malicious.

The importance evaluation unit 142 compares the first document and the second document to evaluate the importance of each character string of the first document and the second document. Based on the importance, the importance evaluation unit 142 extracts, as a keyword, a second character string that characterizes an HTML element that reaches a malicious web page, for each of the HTML text element, the HTML attribute value or the character string in the region of each cluster of the web page.

From two documents that are identical in the extraction object (the HTML text element, the HTML attribute, and the character string in the region) and the cluster and reach a benign web page or a malicious web page, the importance evaluation unit 142 extracts a second character string that characterizes an HTML element that reaches a malicious web page through the use of a natural language processing technique that can achieve evaluation of words and character strings that characterize the document. Here, a conceivable example of the natural language processing technique is tf-idf. It should be noted that the natural language processing technique is not limited to this method.

The tf-idf is a method of evaluating the importance of words in a document. For example, assume an example case where "cluster 1" includes many web pages that propose downloading a file to the user, and, in "cluster 1", "download-button" is included in a document of an HTML element id of an HTML element that reaches a malicious web page, and "share-button" and/or "link-button" is included in a document of an HTML element id of an HTML element that reaches a benign web page. In this case, by applying tf-idf, the importance evaluation unit 142 calculates a high importance value for "download", and calculates a low importance value for "share" and "link" included only in a benign webpage document and for "button" included in both malicious and benign webpage documents.

Then, the importance evaluation unit 142 extracts a character string with an importance exceeding a threshold set in advance as a keyword for each of the extraction object (the HTML text element, the HTML attribute, and the character string in the region) and the cluster.

FIG. 10 is a drawing illustrating an example of character strings whose importance is evaluated by the importance evaluation unit 142 illustrated in FIG. 2. For example, assume an example case where "0.7" is set as the threshold of the importance. In this case, the importance evaluation unit 142 extracts "Download" whose importance is "0.9", and "Click" whose importance is "0.8" as keywords.

FIG. 11 is a drawing illustrating an example of a keyword extracted by the importance evaluation unit 142 illustrated in FIG. 2. As illustrated in FIG. 11, each keyword is associated with the extraction object (the HTML text element, the HTML attribute, and the character string in the region) and the cluster.

The output unit 15 outputs a keyword extracted by the keyword extraction unit 14 to the analysis apparatus 20, for example. The output unit 15 outputs each keyword extracted by the keyword extraction unit 14 in association with the extraction object (the HTML text element, the HTML attribute, and the character string in the region) and the cluster.

Figure 12:
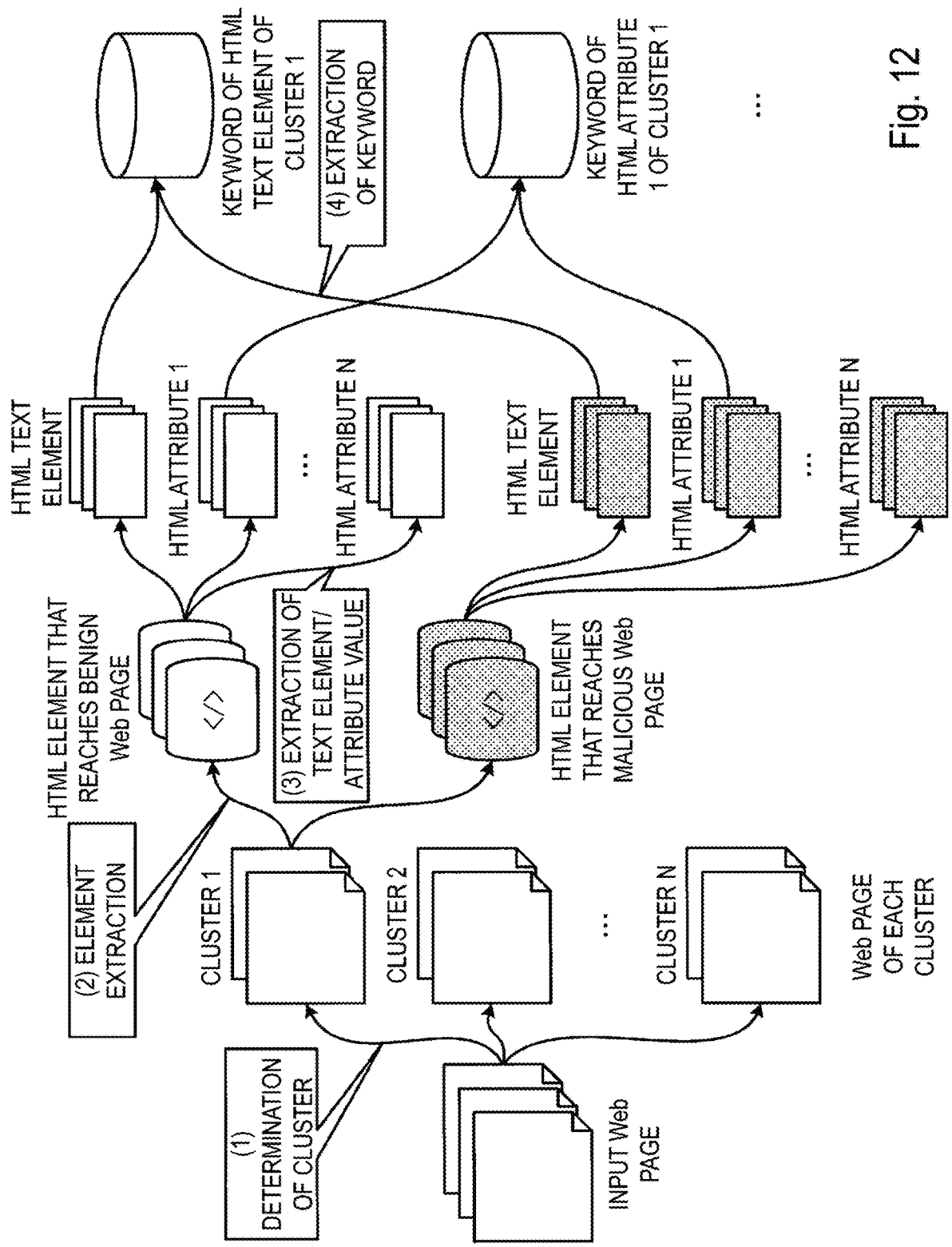
FIG. 12 is an explanatory view of a flow of an extraction process of the extraction apparatus illustrated in FIG. 2.

[Flow of Extraction Process] Next, a flow of an extraction process performed by the extraction apparatus 10 is described. FIG. 12 is an explanatory view of a flow of an extraction process performed by the extraction apparatus 10 illustrated in FIG. 2.

As illustrated in FIG. 12, when an input of information about a plurality of web pages including malicious HTML elements and benign HTML elements is received, the cluster determination unit 12 determines the clusters of the web pages, and classifies the web pages into the clusters (see (1) of FIG. 12).

Subsequently, the element character string extraction unit 13 extracts an HTML element that reaches a malicious web page and an HTML element that reaches a benign web page from the web page of each cluster (see (2) of FIG. 12). The element character string extraction unit 13 extracts an HTML text element, an HTML attribute value or a character string in an image region from each element, and classifies them for each cluster of the web page (see (3) of FIG. 12).

Then, from the character string extracted by the element character string extraction unit 13, a character string that characterizes an HTML element that reaches a malicious web page is extracted as a keyword (see (4) of FIG. 12). The output unit 15 outputs the keyword extracted by the keyword extraction unit 14 to the analysis apparatus 20, for example.

Figure 13:
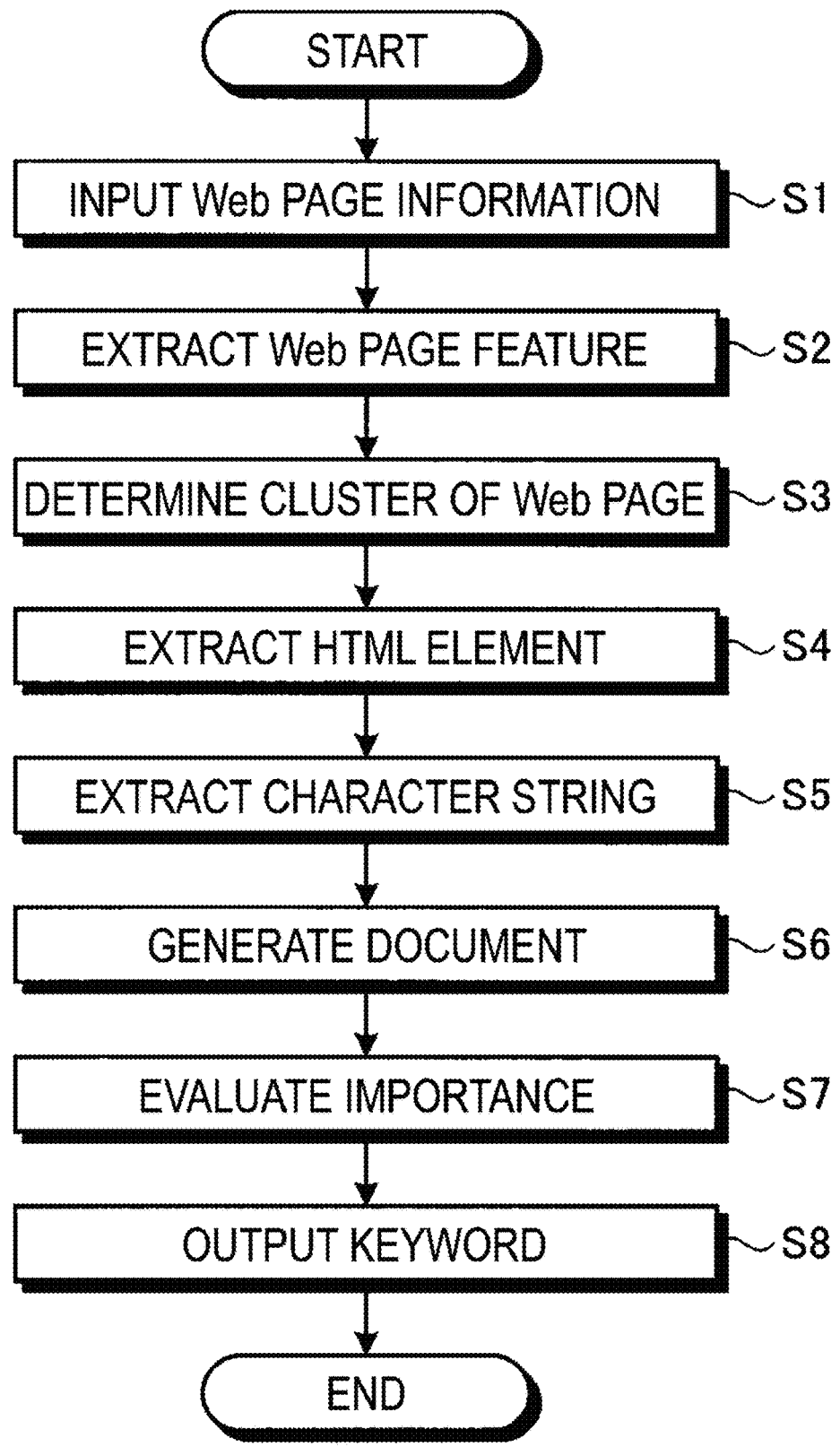
FIG. 13 is a flowchart of a procedure of an extraction process according to the embodiment.

[Procedure of Extraction Process] Next, a procedure of an extraction process according to the embodiment is described. FIG. 13 is a flowchart of a procedure of an extraction process according to the embodiment.

First, the input unit 11 receives an input of information about a plurality of web pages including a malicious HTML element and a benign HTML element (step S1). Then, the cluster determination unit 12 extracts a feature based on each of the plurality of web pages received by the input unit 11 as an input (step S2). The feature is an image feature, a document feature or a structure feature, for example. The cluster determination unit 12 integrates some or all of the features extracted at step S2, determines the cluster of each web page by applying unsupervised learning with the integrated feature as input data corresponding to each web page (step S3), and classifies the web pages into clusters.

The element character string extraction unit 13 extracts an HTML element that reaches a malicious web page and an HTML element that reaches a benign web page from the web page of each cluster (step S4). The element character string extraction unit 13 extracts character strings from the HTML text element, the HTML attribute value or the image in the region of each element extracted at step S4 (step S5), and classifies them for each cluster of the web page.

The keyword extraction unit 14 integrates the character strings extracted at step S5 into a document corresponding to an HTML element that is known to reach a malicious web page and a document corresponding to an HTML element that is known to reach a benign web page for each HTML text element or HTML attribute value of each cluster of the web page (step S6).

The keyword extraction unit 14 evaluates the importance of each character string in the document integrated at step S6 (step S7). Then, the keyword extraction unit 14 extracts a character string with an importance exceeding a threshold set in advance as a keyword as a character string that characterizes an HTML element that is known to reach a malicious web page. The output unit 15 outputs the extracted keyword (step S8).

[Effect of Embodiment] As described above, when the extraction apparatus 10 according to the embodiment receives an input of information about a plurality of web pages including an HTML element that is known to reach a malicious web page through browser operation and an HTML element that is known to reach a benign web page through browser operation, the extraction apparatus 10 classifies the plurality of web pages into clusters. The extraction apparatus 10 extracts an HTML element that reaches a malicious web page and an HTML element that reaches a benign web page from the classified web page of each cluster, and extracts a character string included in the extracted HTML elements. Subsequently, the extraction apparatus 10 extracts, as a keyword, a character string that characterizes an HTML element that reaches a malicious web page from the extracted character string.

Through the above-mentioned process, the extraction apparatus 10 of the present embodiment automatically extracts a keyword that characterizes an HTML element that reaches a malicious web page. That is, the extraction apparatus 10 according to the embodiment can appropriately and automatically extract a keyword that characterizes an HTML element that reaches a malicious web page even with a large amount of data.

Thus, according to the embodiment, a required keyword can be set without dropping an HTML element that reaches a malicious web page even with a large amount of data. In addition, according to the embodiment, the keyword is not set from those not included in an HTML element that reaches a malicious web page, and thus keywords can be appropriately set.

In addition, when an operation for an inducing element is performed by accessing a web page with a web browser to collect a malicious web page, the analysis apparatus 20 can accurately detect an HTML element that reaches a malicious web page through the use of a keyword extracted by the extraction apparatus 10. More specifically, the analysis apparatus 20 analyzes the accessed web page, selects an appropriate cluster corresponding to the web page from a plurality of clusters where the keyword extracted by the extraction apparatus 10 belongs, and detects an HTML element containing therein the keyword of each of the HTML text element, the HTML attribute value or the character string in the region of that cluster.

[System Configuration and the Like] The respective components of the respective devices illustrated are functional and conceptual components, and are not necessarily physically configured as illustrated. That is, a specific form of distribution and integration of the respective devices is not limited to the illustrated form, and all or a portion thereof can be configured to be functionally or physically distributed and integrated in any units according to various loads, use situations, and the like. Further, all or some of processing functions performed by each device may be implemented by a CPU and a program that is analyzed and executed by the CPU, or may be implemented as hardware based on a wired logic.

Further, all or some of the processes described as being performed automatically among the respective processes described in the embodiment can be performed manually, or all or some of the processes described as being performed manually can be performed automatically using a known method. In addition, information including the processing procedures, control procedures, specific names, and various types of data or parameters illustrated in the aforementioned literatures or drawings can be arbitrarily changed unless otherwise specified.

Figure 14:
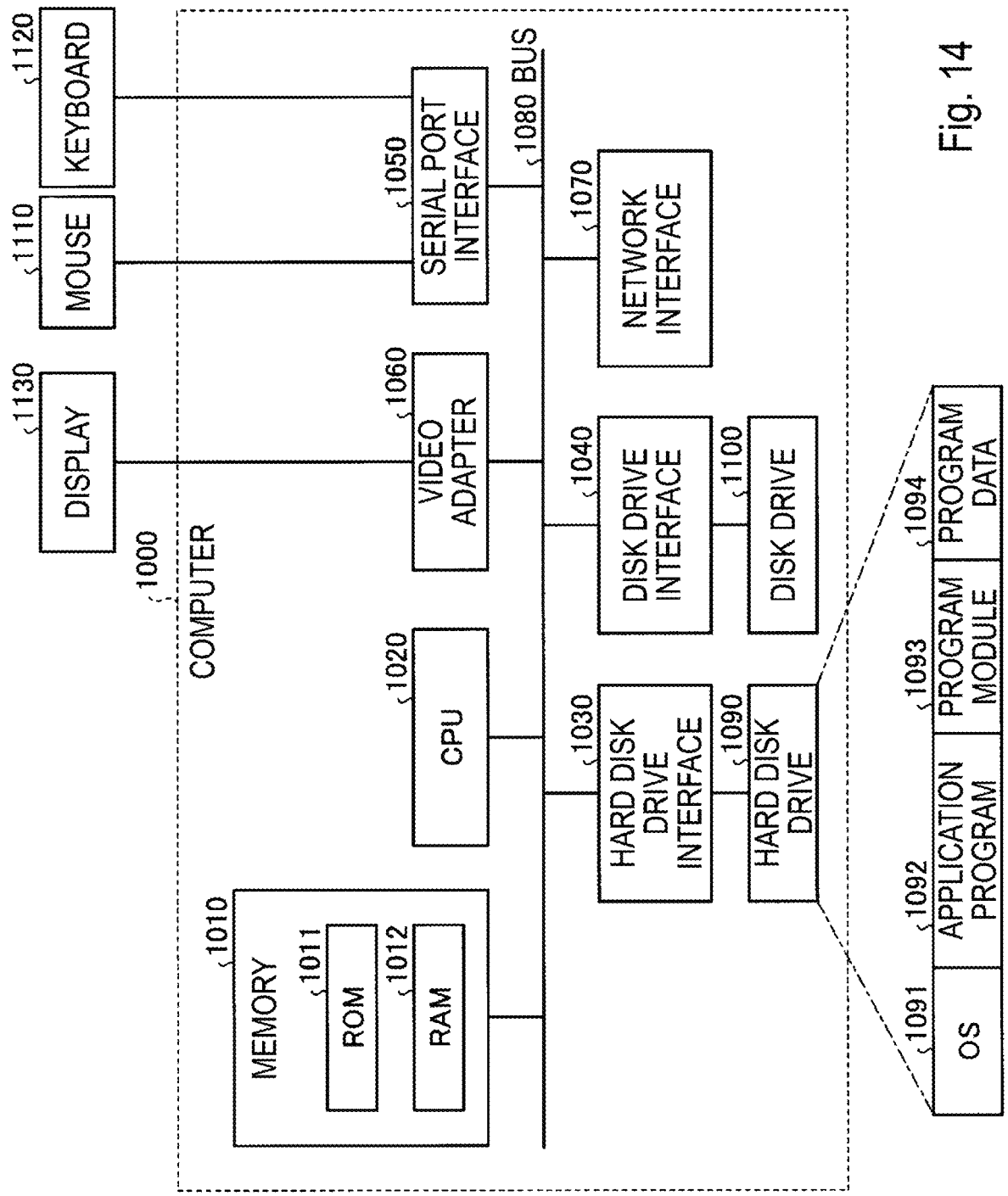
FIG. 14 is a drawing illustrating an example of a computer that executes a program to implement the extraction apparatus.

[Program] FIG. 14 is a drawing illustrating an example of a computer that executes a program to implement the extraction apparatus 10. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A detachable storage medium such as a magnetic disk or an optical disc, for example, is inserted into the disk drive 1100. The serial port interface 1050 is connected to, for example, a mouse 1110 and a keyboard 1120. The video adapter 1060 is connected to a display 1130, for example.

The hard disk drive 1090 stores, for example, an operating system (OS) 1091, an application program 1092, a program module 1093, and program data 1094. That is, a program defining each processing operation of the extraction apparatus 10 is implemented as the program module 1093 in which a computer-executable code is written. The program module 1093 is stored in, for example, the hard disk drive 1090. For example, the program module 1093 for executing the same processing as the functional configuration in the extraction apparatus 10 is stored in the hard disk drive 1090. The hard disk drive 1090 may be replaced with a solid state drive (SSD).

Further, setting data used in the process of the embodiment described above is stored as the program data 1094 in the memory 1010 or the hard disk drive 1090, for example. The CPU 1020 reads the program module 1093 or the program data 1094 stored in the memory 1010 or the hard disk drive 1090 into the RAM 1012 as necessary, and executes the program module 1093 or the program data 1094.

The program module 1093 or the program data 1094 is not limited to being stored in the hard disk drive 1090, and may be stored, for example, in a detachable storage medium and read by the CPU 1020 via the disk drive 1100 or the like. Alternatively, the program module 1093 and the program data 1094 may be stored in another computer connected via a network (LAN, a wide area network (WAN), or the like). The program module 1093 and the program data 1094 may be read from another computer via the network interface 1070 by the CPU 1020.

Although embodiments to which the invention made by the present inventor has been applied have been described above, the present invention is not limited to the description and the drawings that form part of the disclosure of the present invention according to the embodiments. That is, all other embodiments, examples, operation techniques, and the like made by those skilled in the art based on the present embodiments are included in the scope of the present invention.

REFERENCE SIGNS LIST

1 Analysis system
11 Input unit
12 Cluster determination unit
13 Element character string extraction unit
14 Keyword extraction unit
15 Output unit
20 Analysis apparatus
30 Determination apparatus
121 Feature extraction unit
122 Determination unit
131 Element extraction unit
132 Character string extraction unit
141 Document generation unit
142 Importance evaluation unit
N Network
10 Extraction apparatus

The invention claimed is:

1. An extraction apparatus, comprising:
a non-transitory memory;
a network interface configured to receive an input of information about a plurality of web pages including a first hypertext markup language (HTML) element that is known to reach a malicious web page through browser operation and a second HTML element that is known to reach a benign web page through browser operation; and
processing circuitry configured to:
classify the plurality of web pages into clusters;
extract a first HTML element that reaches the malicious web page and a second HTML element that reaches the benign web page from a web page of each cluster that is classified to extract a first character string included in the first and second HTML elements that are extracted;
extract, as a keyword, a second character string that characterizes the first HTML element that reaches the malicious web page from the first character string;
for each of an HTML text element or an HTML attribute value of each cluster of the web page:
generate a first document by integrating a character string related to the first HTML element that is known to reach the malicious web page in the first character string;
generate a second document by integrating a character string related to the second HTML element that is known to reach the benign web page in the first character string;
evaluate an importance of the character strings of the first document and the second document by comparing the first document and the second document; and
extract, as the keyword, the second character string that characterizes the first HTML element that reaches the malicious web page based on the importance for each of the HTML text element, the HTML attribute value or the character string in a region of each cluster of the web page; and
evaluate the importance of each character string in the integrated first document and the integrated second document and extract a character string with the importance exceeding a threshold as the keyword, wherein
the network interface is further configured to output the extracted keyword.

2. The extraction apparatus according to claim 1, wherein based on the plurality of web pages, the processing circuitry is further configured to
extract image information representing visual information as a feature from image data of a screen of the web page drawn in a web browser,
extract document information representing a meaning and/or a topic of a document as a feature from text data in the web page, and
extract HTML structure information representing an internal structure of the web page as a feature from a source code of the web page.

3. The extraction apparatus according to claim 2, wherein the processing circuitry is further configured to classify the web pages into clusters by integrating some or all of features that are extracted and applying unsupervised learning with the features that are integrated as input data corresponding to each web page.

4. The extraction apparatus according to claim 1, wherein the processing circuitry is further configured to
extract the first HTML element that is known to reach the malicious web page and the second HTML element that is known to reach the benign web page for each cluster from information about the web page of each cluster that is classified, and
extract the first character string from an HTML text element, an HTML attribute value or a character string in a region of the first and second HTML elements that are extracted.

5. An extraction method executed by extraction apparatus, comprising:
receiving an input of information about a plurality of web pages including a first hypertext markup language (HTML) element that is known to reach a malicious web page through browser operation and a second HTML element that is known to reach a benign web page through browser operation;
classifying the plurality of web pages whose input is received into clusters;
extracting a first HTML element that reaches the malicious web page and a second HTML element that reaches the benign web page from a web page of each cluster that is classified to extract a first character string included in the first and second HTML elements that are extracted;

extracting, as a keyword, a second character string that characterizes the first HTML element that reaches the malicious web page from the first character string;

for each of an HTML text element or an HTML attribute value of each cluster of the web page:
- generating a first document by integrating a character string related to the first HTML element that is known to reach the malicious web page in the first character string;
- generating a second document by integrating a character string related to the second HTML element that is known to reach the benign web page in the first character string;
- evaluating an importance of the character strings of the first document and the second document by comparing the first document and the second document; and
- extracting, as the keyword, the second character string that characterizes the first HTML element that reaches the malicious web page based on the importance for each of the HTML text element, the HTML attribute value or the character string in a region of each cluster of the web page;

evaluating the importance of each character string in the integrated first document and the integrated second document and extracting a character string with the importance exceeding a threshold as the keyword; and outputting the extracted keyword.

6. A non-transitory computer-readable recording medium storing therein an extraction program that causes a computer to execute a process comprising:

receiving an input of information about a plurality of web pages including a first hypertext markup language (HTML) element that is known to reach a malicious web page through browser operation and a second HTML element that is known to reach a benign web page through browser operation;

classifying the plurality of web pages whose input is received into clusters;

extracting a first HTML element that reaches the malicious web page and a second HTML element that reaches the benign web page from a web page of each cluster that is classified to extract a first character string included in the first and second HTML elements that are extracted;

extracting, as a keyword, a second character string that characterizes the first HTML element that reaches the malicious web page from the first character string;

for each of an HTML text element or an HTML attribute value of each cluster of the web page:
- generating a first document by integrating a character string related to the first HTML element that is known to reach the malicious web page in the first character string;
- generating a second document by integrating a character string related to the second HTML element that is known to reach the benign web page in the first character string;
- evaluating an importance of the character strings of the first document and the second document by comparing the first document and the second document; and
- extracting, as the keyword, the second character string that characterizes the first HTML element that reaches the malicious web page based on the importance for each of the HTML text element, the HTML attribute value or the character string in a region of each cluster of the web page;

evaluating the importance of each character string in the integrated first document and the integrated second document and extracting a character string with the importance exceeding a threshold as the keyword; and outputting the extracted keyword.

\* \* \* \* \*